US007866670B2

(12) United States Patent
Dhole et al.

(10) Patent No.: US 7,866,670 B2
(45) Date of Patent: Jan. 11, 2011

(54) STATIC GASKET

(75) Inventors: Moreshwar Dhole, Southfield, MI (US); Thomas Hemmrich, Bloomfield Hills, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 354 days.

(21) Appl. No.: 11/936,489

(22) Filed: Nov. 7, 2007

(65) Prior Publication Data

US 2008/0143056 A1    Jun. 19, 2008

Related U.S. Application Data

(60) Provisional application No. 60/864,823, filed on Nov. 8, 2006.

(51) Int. Cl.
*F02F 11/00* (2006.01)
(52) U.S. Cl. .............................. 277/592; 277/652
(58) Field of Classification Search ................ 277/592, 277/594, 595, 596, 608, 648, 649, 651, 652
See application file for complete search history.

(56) References Cited

U.S. PATENT DOCUMENTS

| 126,624 | A | * | 5/1872 | Coffee | 277/649 |
|---|---|---|---|---|---|
| 480,643 | A | * | 8/1892 | Welsh | 277/612 |
| 1,777,443 | A | * | 10/1930 | Mastin | 277/648 |
| 1,883,609 | A |  | 10/1932 | Dennis |  |
| 3,794,333 | A |  | 2/1974 | Czernik et al. |  |
| 4,181,313 | A |  | 1/1980 | Hillier et al. |  |
| 4,519,618 | A | * | 5/1985 | Klingel, Sr. | 277/651 |
| 4,625,979 | A |  | 12/1986 | Inciong |  |
| 4,721,555 | A | * | 1/1988 | Grosshandler | 204/252 |
| 4,778,189 | A |  | 10/1988 | Udagawa |  |
| 4,828,275 | A |  | 5/1989 | Udagawa |  |
| 5,090,713 | A |  | 2/1992 | Johnson |  |
| 5,145,190 | A |  | 9/1992 | Boardman |  |
| 5,183,267 | A | * | 2/1993 | Ackerman et al. | 277/630 |
| 5,322,299 | A |  | 6/1994 | Terai |  |
| 5,615,898 | A | * | 4/1997 | Clark et al. | 277/596 |
| 5,700,015 | A |  | 12/1997 | Tensor |  |
| 5,975,540 | A |  | 11/1999 | Miyaoh |  |
| 6,354,599 | B1 |  | 3/2002 | Inamura |  |

(Continued)

FOREIGN PATENT DOCUMENTS

EP          0851157        12/1996

(Continued)

*Primary Examiner*—Shane Bomar
*Assistant Examiner*—Gilbert Y Lee
(74) *Attorney, Agent, or Firm*—Robert L. Stearns; Dickinson Wright, PLLC

(57) ABSTRACT

A static gasket has a gasket core with opposite surfaces with at least one fluid conveying opening passing through the surfaces. A layer of elastomeric sealing material is applied to at least one of the opposite surfaces to provide a plurality of walled-off regions each completely bounded by a peripheral wall of at least partially varying height extending outwardly from the respective gasket core surface. The layer includes at least first and second sealing threads of the sealing material extending outwardly from the respective surface of the gasket core with the sealing threads extending continuously about the fluid opening in spaced relation to one another, and a plurality of bridge threads extending continuously between and intersecting the first and second sealing threads.

24 Claims, 4 Drawing Sheets

U.S. PATENT DOCUMENTS

| | | | |
|---|---|---|---|
| 6,436,509 B1 * | 8/2002 | Demaray et al. | 428/141 |
| 6,543,785 B1 * | 4/2003 | Katayama et al. | 277/534 |
| 7,490,835 B2 * | 2/2009 | Diez et al. | 277/593 |
| D589,597 S * | 3/2009 | Bloch et al. | D23/249 |
| 7,611,435 B2 * | 11/2009 | Beutler | 475/160 |
| 2005/0046117 A1 | 3/2005 | Novil et al. | |
| 2005/0151327 A1 | 7/2005 | Udagawa et al. | |

FOREIGN PATENT DOCUMENTS

| | | |
|---|---|---|
| FR | 2685943 | 7/1993 |
| JP | 408159284 | 6/1996 |

\* cited by examiner

STATIC GASKET

CROSS-REFERENCE TO RELATED APPLICATION

This application claims the benefit of U.S. Provisional Application Ser. No. 60/864,823, filed Nov. 8, 2006, which is incorporated herein by reference in its entirety.

BACKGROUND OF THE INVENTION

1. Technical Field

This invention relates generally to static gaskets for use in sealing a clamped joint, such as that of an intake manifold of an internal combustion V engine.

2. Related Art

Clamped joints often do not have precise, uniform mating surfaces. As such, creating a gas and/or fluid tight seal across the joint can prove challenging. For example, the joint between an intake manifold and mating cylinder heads of an internal combustion engine, and particularly a V-type engine block, can be difficult to seal. The intake manifold is fastened to upwardly facing sealing surfaces of the cylinder heads with an intake manifold gasket or gaskets installed between the respective sealing surfaces of the cylinder heads and the manifold. When the fasteners properly tightened, the intake manifold and cylinder heads are clamped together, wherein the intake manifold gaskets serve to perfect a gas and fluid-tight seal at the joint. However, difficulties can arise when the sealing surfaces of the cylinder heads are misaligned. Misalignment can occur as a result of machining imperfections and/or stack-up tolerances from the various parts being fastened together, thereby bringing the sealing surface of one or both of the cylinder heads out of the predetermined ideal position to establish a tight seal. For example, an ideal position may call for the sealing surfaces of the cylinder heads to lie in a common plane. Stack-up tolerances may result in one or more of the sealing surfaces being positioned slightly above, below or skewed relative to the plane. The intake manifold, in turn, having a planar sealing surface requires the sealing surfaces of the cylinder heads to be coplanar to provide the proper support to the gaskets to achieve a gas and fluid-tight seal. When the mating sealing surfaces are misaligned relative to one another, a step is created in the otherwise planar support surfaces that abut the intake manifold gasket leading to irregular loading of the gasket and potential difficulties in achieving an adequate seal.

The problem is made worse by variation in the sealing conditions that can occur in the manufacture of engines. The stack-up tolerances may result in the sealing surfaces of one engine being in the proper planar arrangement, while the next engine may have one of the sealing surfaces stepped up from the plane and the next engine may have the same or the other sealing surface stepped down from the plane, and so forth. This changing environment presents a real challenge to static seal gaskets that rely on planar support surfaces for establishing a reliable seal.

SUMMARY OF THE INVENTION

A static gasket has a gasket core with opposite surfaces and with at least one fluid conveying opening passing through the surfaces. A layer of elastomeric sealing material is applied to the surfaces. The layer has at least first and second threads of the sealing material extending outwardly from the surfaces of the gasket core with the threads extending continuously about the fluid opening in spaced relation to one another. The layer has a plurality of bridge threads extending continuously between and intersecting the first and second threads to provide a plurality of isolated walled-off regions completely bound by portions of the first and second threads and adjacent ones of the bridge threads.

According to another aspect of the invention, a static gasket has a gasket core with opposite surfaces with at least one fluid conveying opening passing through the surfaces. A layer of elastomeric sealing material is applied to at least one of the opposite surfaces so that the layer provides a plurality of walled-off regions. The walled-off regions are completely bounded by a peripheral wall extending outwardly from the respective gasket core surface, wherein the peripheral wall has an at least partially varying height.

Such a gasket, among other things, is able to seal under variable support conditions such as those described above in connection with an intake manifold joint. The variable height threads accommodate variable loading to achieve a reliable seal and the bridge threads serve to maintain a perimeter seal and contain the fluid from leaking even if one of the sealing threads becomes breached.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
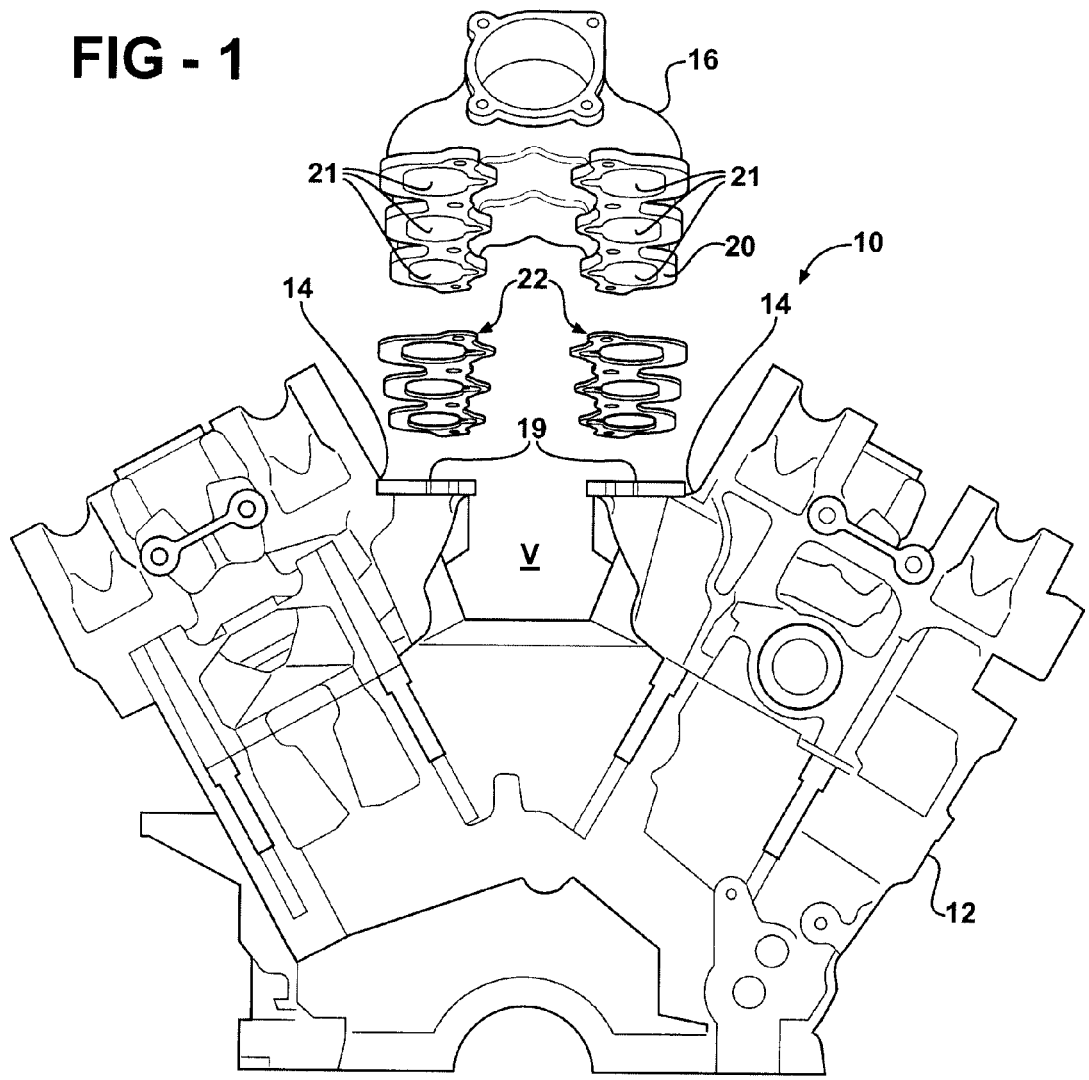
FIG. 1 is a schematic partially exploded elevation view of a V-6 engine having cylinder heads and an intake manifold to be sealed with a static gasket constructed according to one aspect of the invention disposed therebetween.

Referring in more detail to the drawings, FIG. 1 illustrates a representative internal combustion engine, shown here as a V-block engine, by way of example and without limitation, generally at 10. The engine 10 includes an engine block 12, a pair of cylinder heads 14 and an intake manifold 16. The cylinder heads 14 are fastened to the engine block 12, such as by bolts (not shown), in conventional manner. The cylinder heads 14 have respective upper sealing surfaces 17, 18 that are each separately planer. A plurality of air intake openings or ports 19 are provided in the cylinder heads 14 and are open to the sealing surfaces 17, 18. In the case of a V-6 engine, there are typically a bank of three such intake ports 19 provided in each cylinder head 14 corresponding to three cylinders (not shown) in each cylinder head 14. The intake ports 19 are typically arranged in-line in the longitudinal or lengthwise direction of the cylinder heads 14. The intake manifold 16 extends across a valley (V) between the cylinder heads 14 and is fastened, such as by bolts (not shown), to the cylinder heads 14. The intake manifold 16 has a plurality of associated air passages 21 that communicate with the air intake ports 19 of the cylinder heads 14 across a planer lower sealing surface 20 of the intake manifold 16. A static gasket 22 constructed in accordance with the invention is positioned between each of the sealing surfaces 17, 18, of the cylinder heads 14 and the sealing surface 20 of the intake manifold 16 to provide an air and fluid-tight seal across the air intake ports 19 of the cylinder heads 14 and the associated air passages 21 of the intake manifold 16 at the joint therebetween.

Figure 2:
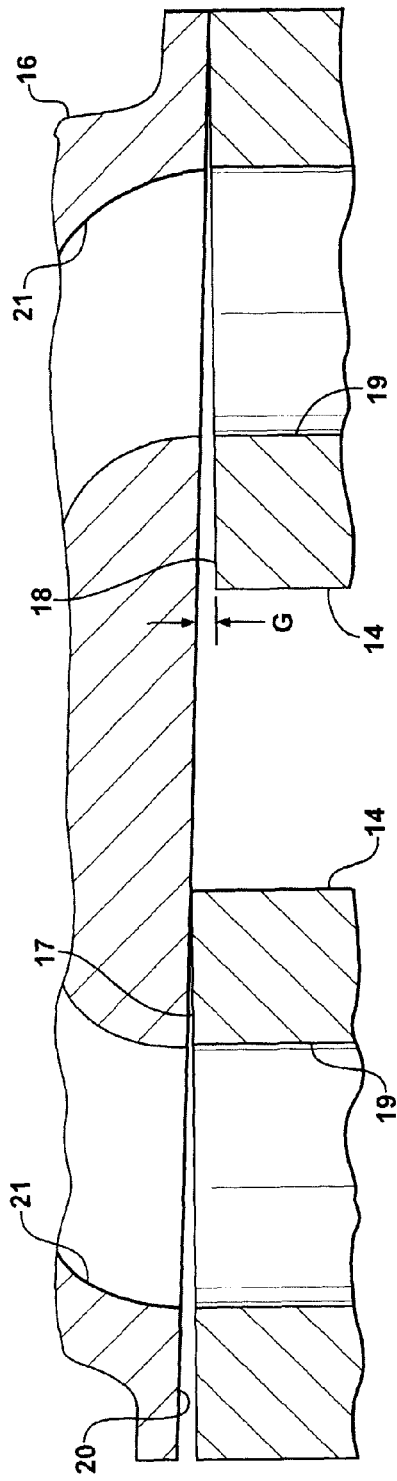
FIG. 2 is a schematic diagram illustrating, in greatly exaggerated fashion, an offset or step that can occur between the sealing surfaces of the cylinder head.

Ideally, the sealing surfaces 17, 18 of the cylinder heads 14 are arranged in a predetermined position relative to one another to correspond to a fixed position of the sealing surface 20 of the intake manifold 16 to provide proper mating sealing engagement between the sealing surface 20 of the intake manifold 16 and the sealing surfaces 17, 18 of the cylinder heads 14. When the surfaces 17, 18 are properly aligned, typically in parallel and coplanar relationship with one another, the static gaskets 22 are able to be uniformly compressed to form an air and fluid-tight seal across the joint. However, up till now, problems could arise when the sealing surfaces 17, 18 of the cylinder heads 14 are misaligned relative to one another, such as shown in an exaggerated view in FIG. 2. This can occur, for example, as a result of the stack-up of tolerances from the various components being machined and bolted together. Conditions that are known to exist are where the sealing surface 17 of one of the cylinder heads 14 is positioned above or below the sealing surface 18 of the other cylinder head 14. This condition moves the sealing surfaces 17, 18 out of their ideal relative coplanar relationship, thus, having the effect of introducing a step or offset between the sealing surfaces 17, 18. As such, the sealing surface 20 of the intake manifold 16 is not able to properly mate with and engage the sealing surfaces 17, 18 when a variable thickness gap G is introduced within the joint. This can present a challenge to achieving a proper seal when using conventional intake manifold gaskets. Further difficulties arise in trying to address the problem in that the precise relationship between the sealing surfaces 17, 18 is not consistent from engine to engine. For example, in one modular engine, the right cylinder head may be bolted into position relatively higher than the left cylinder head, whereas in the next modular engine the right cylinder head may be relatively lower than the left cylinder head, and in still the next engine the cylinder heads may be properly positioned with their sealing surfaces 17, 18 aligned in coplanar relation with one another. The static gasket 22 constructed in accordance with the invention is able to accommodate these and other irregularities in the relative positions of the sealing surfaces 17, 18, 20, and thus, can provide an air and fluid-tight seal equally well regardless of whether the surfaces 17, 18 are aligned in relative coplanar relation with one another or misaligned, such as by being stepped relative to one another.

Figure 3:
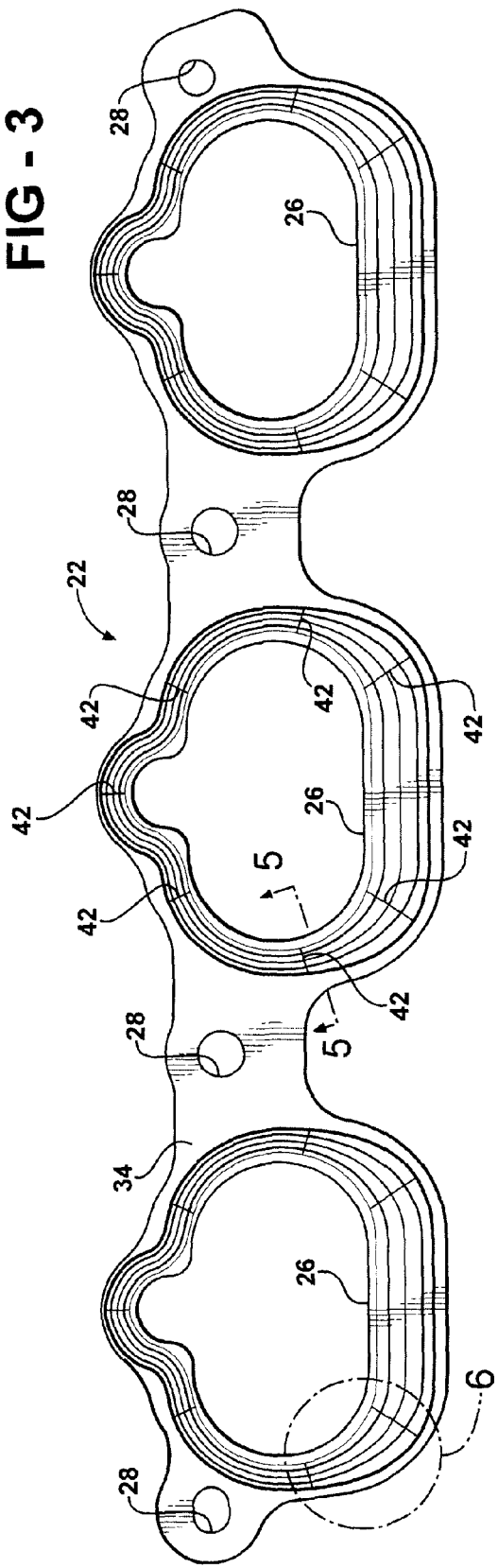
FIG. 3 is a plan view of the static gasket.
Figure 5:
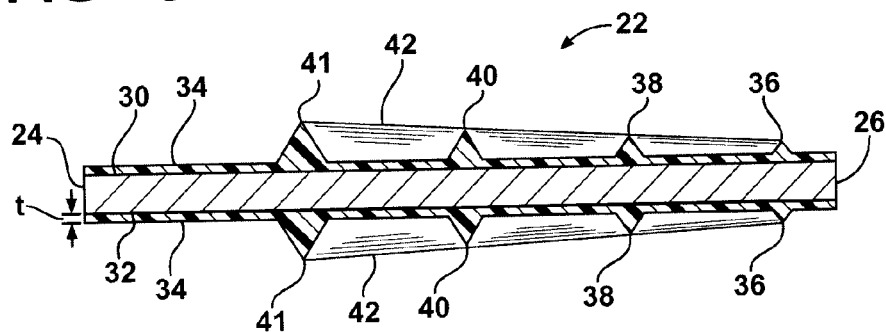
FIG. 5 is a cross-sectional view taken generally along line 5-5 of FIG. 4.

As best shown in FIG. 5, the gasket 22 has a gasket core 24 that may be substantially flat and planar. The core 24 can be constructed of any suitable material for the intended application, such as hard plastics, cork, nonwoven materials, or metal, for example steel, with one embodiment being constructed of soft galvanized steel, by way of example and without limitation. The core 24 can be constructed having a wide range of thickness, and may be very thin, having a thickness of about 0.2 mm, though it could be greater, depending on the material used and the performance requirements of the application. As best shown in FIG. 3, the core 24 is formed with at least one fluid opening 26 for the conveyance of air and fluids. In the case of a gasket suitable for use as an intake manifold gasket, the core 24 would include a plurality of such fluid openings 26 corresponding to the number of air/fluid passages of the associated cylinder head 14 and intake manifold 16. The core 24 may have one or more additional openings 28 spaced from the air/fluid openings 26 for accommodating the fasteners (not shown) used to mount the manifold 16 to the cylinder heads 14.

Figure 4:
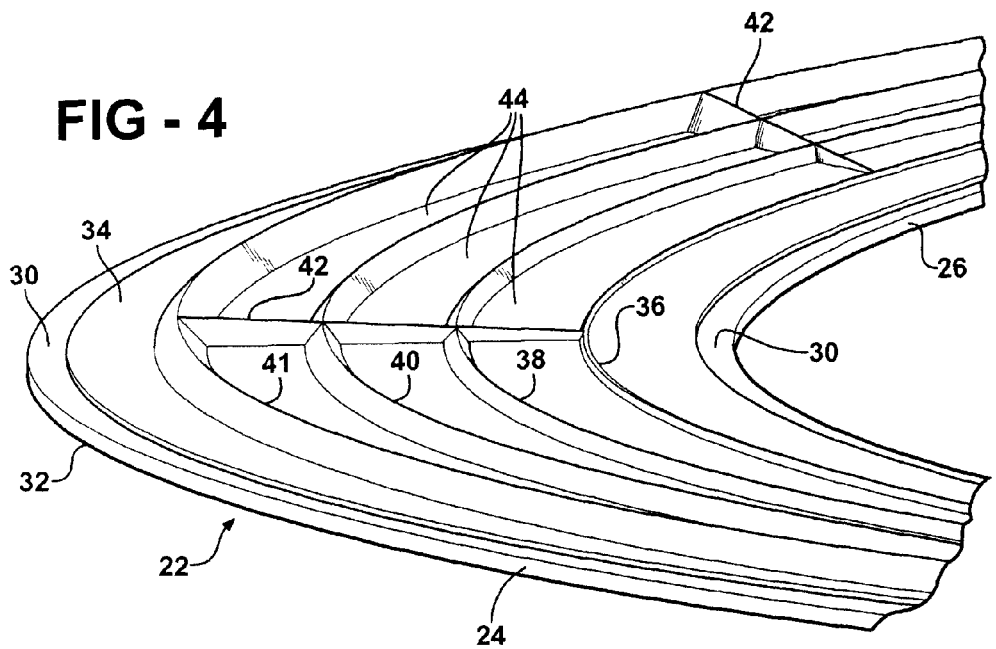
FIG. 4 is an enlarged fragmentary perspective view of the static gasket illustrating sealing threads and bridge threads.
Figure 4A:
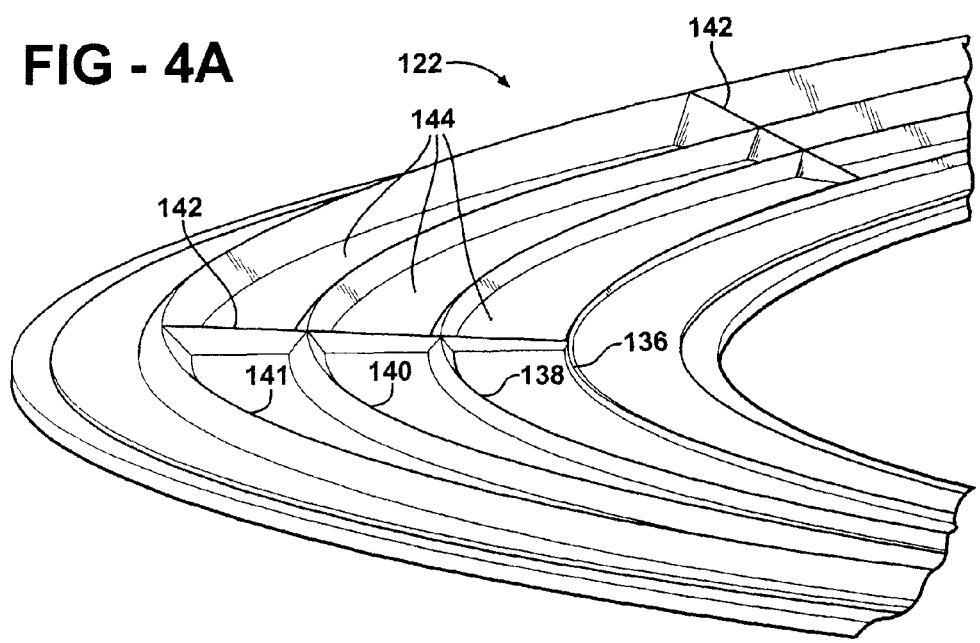
FIG. 4A is a view similar to FIG. 4 showing a gasket constructed according to another aspect of the invention.
Figure 6:
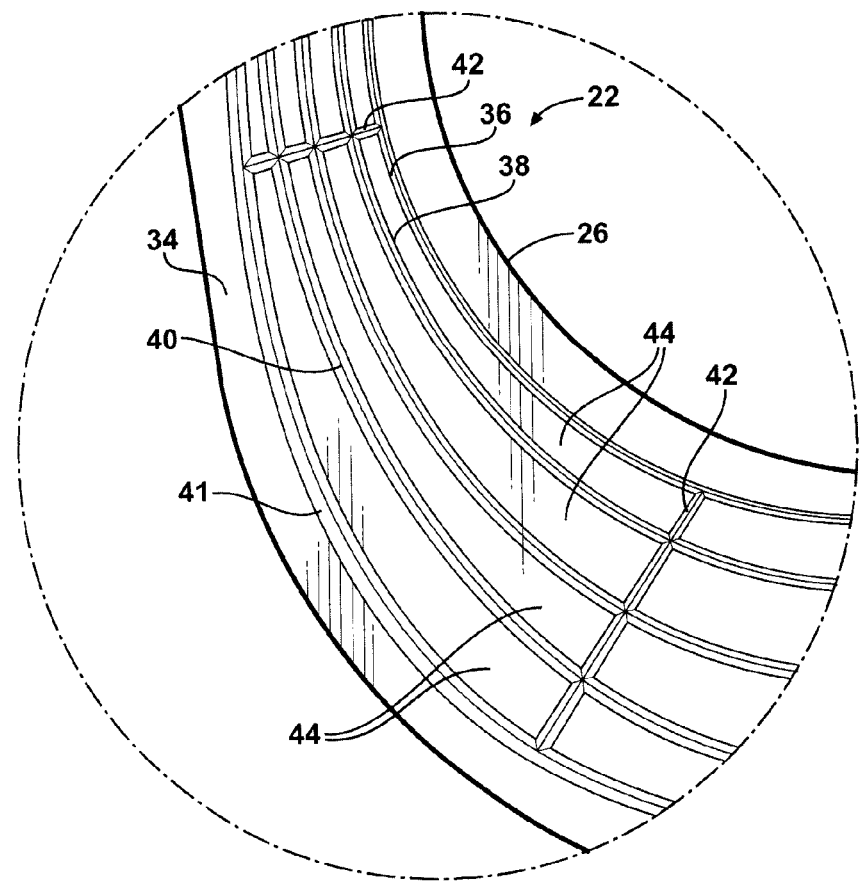
FIG. 6 is a schematic fragmentary plan view of the static gasket of FIG. 4.

Referring again to FIG. 5, the core 24 presents opposite sealing surfaces 30, 32. One or both of the surfaces 30, 32 may be entirely or substantially covered with a single thin layer 34 of polymeric sealing material (FIGS. 4 and 4A show an example of sealing surfaces 30, 32 being substantially covered, while FIGS. 3, 5 and 6 show completely covered sealing surfaces 30, 32). The sealing material may comprise any of a number of materials suitable for sealing applications, such as silicone, for example, or any other suitable elastomeric material. The layer 34 may be very thin, having a thickness (t), such that the thickness t is 0<t<0.5 mm in areas where it is present.

As best shown in FIGS. 4-6, each layer 34 is formed with at least first and second raised beads or threads 36, 38 of the sealing material extending outwardly from the surfaces 30, 32 and about each fluid opening 26. The first thread 36 is a radially innermost one of the threads nearest to the associated fluid opening 26. The second thread 38 is formed radially outwardly of the first thread 36. The threads 36, 38 extend continuously about the associated fluid opening 26 in circumferentially spaced, nonintersecting relation to one another. Each layer may include at least a third thread 40 disposed radially outwardly of the second thread 38, and likewise, extending continuously about the associated fluid opening 26 in circumferentially spaced, nonintersecting relation with the second thread 38. Further yet, the gasket 22 could be constructed having a fourth thread 41 radially outwardly of the third thread 40, and likewise, extending continuously about the associated fluid opening 26 in circumferentially spaced, nonintersecting relation with the third thread 40. The threads 36, 38, 40, 41 may have a generally triangular cross-sectional profile (FIG. 5) and may have variable heights both relative to one another, and may also changing height in the circumferential direction. For example, as shown in FIG. 4A, a gasket 122 constructed in accordance with the invention has threads 136, 138, 140, 141 that not only vary in height along the radial direction relative to one another, but also vary in height circumferentially to provide a substantially constant clamping pressure across the joint. The outer threads are generally taller than the inner threads. Accordingly, the height of the threads 36, 38, 40, 41 increase, respectively, as you move away from the fluid opening 26, with the thread 41 being taller than thread 40, and thread 40 being taller than thread 38, and thread 38 being taller than the innermost thread 36. The range in height of the threads varies from about 0.18 for the radially innermost thread 36 to about 1.03 mm for the radially outermost thread 40.

Each layer 34 further includes a plurality of bridge threads 42 that extend transversely between and interconnect at least a pair of threads, such as the first and second threads 36, 38. The bridge threads 42 extend generally radially outwardly from the fluid openings 26 and are spaced circumferentially from one another. The bridge threads 42 serve to partition the annular space between the threads 36, 38 into a plurality of isolated, walled-off pockets or regions 44. Each region 44 is completely walled-off by a pair of adjacent bridge threads 42 in the circumferential direction and a portion of the seal threads 36, 38 in the radial direction. A plurality of bridge threads 42 may further extend transversely between and interconnect the second and third sealing threads 38, 40 in the same manner to provide similar sealed regions 44 between the second and third sealing threads 38, 40, and further, the bridge threads 42 may extend between the third and fourth sealing threads 40, 41 to provide yet additional sealed regions 44. The bridge threads 42 may be oriented perpendicular to the direction of the sealing threads 36, 38, 40 and 41 and extend as continuous threads from the radially innermost one of said sealing threads 36 to the radially outermost one of the sealing threads 41. In addition, rather than being formed as continuous threads from the innermost thread 36 to the outermost thread 41, the bridge threads 42 could extend between adjacent ones of the sealing threads 36, 38, 40, 41 to provide radially discontinuous, circumferentially offset bridge threads. The height of the bridge threads 42 may vary to coincide with the height of the sealing threads 36, 38, 40, 41 such that the bridge threads 42 do not extend above or below the sealing threads. As such, the bridge threads 42 though variable in height, can be formed uniformly to one another, or as shown in FIG. 4A, the bridge threads 142 could be formed having differing relative heights. Accordingly, the walled-off regions 44, 144 are completely bounded by a peripheral wall extending outwardly from the surfaces 30, 32, wherein the peripheral wall has at least a partially varying height. For example, the height of the peripheral wall corresponding with the bridge threads 42 varies, as well as the height of the peripheral wall corresponding to the respective sealing threads 36, 38, 40, 41. As will be appreciated, the illustrated sealing and bridge threads are provided on both sides of the gasket 22, since they are formed in each sealing layer 34, as illustrated in FIG. 5.

In operation, when the gasket 22 is clamped between the cylinder head 14 and intake manifold 16, the variable height threads 36, 38, 40, 41 are compressed. In the event of misalignment such that there is a step or gap G present in the joint, the taller threads are compressed more than the shorter threads, such that at some point along the radial direction, one or more of the threads is brought into sealing contact with the sealing surfaces 17, 18 of the cylinder heads 14 and the sealing surface 20 of the intake manifold 16 completely about the circumference of the fluid opening 26. Where the gap G is smallest, the taller threads may be overcompressed while the shorter threads in those regions will be compressed the desired amount and will provide an adequate seal. In the event that one of the sealing threads were to fail or be breached by the fluid (e.g., the inner most thread 36), the fluid would enter an associated one of more of the walled-off sealed regions 44 to contain the fluid from leaking outwardly from and beyond the gasket 22. If one of the bridge threads 42 were to fail or be breached, any fluid that escapes would be contained by the next bridge thread 42. The second bank of sealed regions 44 between the second and third threads 38, 40 adds an extra level of protection against fluid leakage, while the third bank of similar sealed regions 44 provided between the third and fourth threads 40, 41 further enhance the protection against fluid leakage.

It is to be understood that other embodiments of the invention which accomplish the same function are incorporated herein within the scope of any ultimately allowed patent claims. Accordingly, many modifications and variations of the present invention are possible in light of the above description and the appended claims.

What is claimed is:

1. A static gasket, comprising:
    a gasket core having opposite surfaces with at least one fluid conveying opening passing through said surfaces; and
    a layer of elastomeric sealing material applied to said surfaces, said layer having a plurality of circumferentially continuous threads of said sealing material extending outwardly from said surfaces of said gasket core, said plurality of circumferentially continuous threads extending continuously about an associated single said fluid opening in spaced relation to one another, said layer having a plurality of bridge threads extending transversely between and intersecting said plurality of circumferentially continuous threads to provide a plurality of isolated walled-off regions completely bound by portions of said circumferentially continuous threads and adjacent ones of said bridge threads, said gasket core being free of any openings in any of said plurality of said walled-off regions.

2. The static gasket of claim 1 wherein said plurality of circumferentially continuous threads are non-intersecting.

3. The static gasket of claim 2 wherein said plurality of circumferentially continuous are concentric to one another.

4. The static gasket of claim 1 wherein a first thread of said plurality of said threads is closer to said fluid conveying opening than a second thread, said second thread of said pluarlity having a greater height than said first thread.

5. The static gasket of claim 4 wherein said first thread and said second thread each have a substantially constant respective circumferential height.

6. The static gasket of claim 4 wherein each of said bridge threads have a height that varies to coincide with the height of said first and second threads.

7. The static gasket of claim 4 wherein there are multiple ones of said fluid conveying openings and multiple sets of said annular and bridge threads associated with each of said openings.

8. The static gasket of claim 7 wherein there are said first and second threads have heights that vary proportionately to one another.

9. The static gasket of claim 4 further comprising a third thread of said sealing material extending outwardly from said surfaces of said gasket core, said third thread extending continuously about said fluid opening in radially outwardly spaced relation from said second thread, said plurality of bridge threads extending between and intersecting said second and third threads to provide a plurality of isolated walled-off regions completely bound by portions of said second and third threads and adjacent ones of said bridge threads.

10. A static gasket, comprising:
    a gasket core having opposite surfaces with at least one fluid conveying opening passing through said surfaces; and
    a layer of elastomeric sealing material applied to said surfaces, said layer having a plurality of annular threads of said sealing material extending outwardly from each of said surfaces of said gasket core, said annular threads extending continuously about said fluid opening in spaced, non-intersecting relation to one another with adjacent ones of said annular threads having differing heights from one another, said layer having a plurality of bridge threads extending between and intersecting said annular threads to provide a plurality of isolated walled-off regions completely bound by portions of said annular threads and adjacent ones of said bridge threads any of said walled off regions being free of any openings through said gasket core.

11. The static gasket of claim 10 wherein each of said annular threads has a substantially constant height, said heights increasing in a direction extending radially outwardly from said fluid conveying opening.

12. The static gasket of claim 11 wherein said bridge threads have a height that varies to coincide with the height of said annular threads.

13. The static gasket of claim 10 wherein each of said annular threads has a constantly varying height extending circumferentially about said fluid conveying opening, said heights of said annular threads increasing relative to one another along a direction extending radially outwardly from said fluid conveying opening.

14. The static gasket of claim 13 wherein said bridge threads have a height that varies to coincide with the height of said annular threads.

15. The static gasket of claim 10 wherein said bridge threads extend continuously radially outwardly from a radially innermost one of said annular threads to a radially outermost one of said annular threads.

16. The static gasket of claim 15 wherein said bridge threads extend transverse to said annular threads.

17. An intake manifold gasket, comprising:
a gasket core having opposite surfaces with a plurality of fluid conveying air intake openings passing through said surfaces; and
a layer of elastomeric sealing material applied to at least one of said surfaces in surrounding relation to each of said air intake openings, said layer providing a plurality of walled-off regions, each of said walled-off regions being completely bounded by a peripheral wall extending outwardly from said at least one of said surfaces, said peripheral wall having an at least partially varying height and any of said plurality of walled-off regions being free of any openings through said gasket core.

18. The intake manifold gasket of claim 17 wherein said layer is applied to both of said opposite surfaces.

19. The intake manifold gasket of claim 17 wherein each of said peripheral walls is provided at least in part by a pair of annular threads of said sealing material extending continuously about each respective one of said air intake openings in spaced, non-intersecting relation to one another.

20. The intake manifold gasket of claim 19 wherein said annular threads have different heights from one another.

21. The intake manifold gasket of claim 19 wherein each of said peripheral walls is provided at least in part by a pair of bridge threads extending generally radially outwardly from said respective air intake opening between and intersecting said pair of annular threads.

22. The intake manifold gasket of claim 21 wherein said bridge threads increase in height along a direction extending radially outwardly from said respective air intake opening.

23. The intake manifold gasket of claim 19 wherein said peripheral walls are provided by at least three annular threads extending continuously about each associated air intake opening in radially spaced relation to one another, said annular walls having different heights relative to one another.

24. The intake manifold gasket of claim 23 wherein said bridge threads extend between and intersect said at least three annular threads, said bridge threads having a height that varies to coincide with the height of said at least three annular threads.

* * * * *